US008896698B2

(12) United States Patent
Brester

(10) Patent No.: US 8,896,698 B2
(45) Date of Patent: Nov. 25, 2014

(54) FRONT END MOUNTED VIDEO CAMERA FOR VEHICLE

(75) Inventor: Robert R. Brester, Milwaukee, WI (US)

(73) Assignee: Velvac Incorporated, New Berlin, WI (US)

(*) Notice: Subject to any disclaimer, the term of this patent is extended or adjusted under 35 U.S.C. 154(b) by 1135 days.

(21) Appl. No.: 12/770,909

(22) Filed: Apr. 30, 2010

(65) Prior Publication Data

US 2011/0267466 A1 Nov. 3, 2011

(51) Int. Cl.
*H04N 7/00* (2011.01)
*H04N 7/18* (2006.01)
*H04N 5/64* (2006.01)
*B62D 35/00* (2006.01)
*B60R 11/04* (2006.01)
*B60R 1/12* (2006.01)

(52) U.S. Cl.
CPC ............... *H04N 7/183* (2013.01); *B60R 11/04* (2013.01); *B60R 2001/1253* (2013.01)
USPC ........... 348/148; 348/118; 348/154; 348/155; 348/837; 296/181.5

(58) Field of Classification Search
None
See application file for complete search history.

(56) References Cited

U.S. PATENT DOCUMENTS

| 5,289,321 A * | 2/1994 | Secor ........................... 359/896 |
| 5,619,036 A * | 4/1997 | Salvio et al. ................... 250/330 |
| 2002/0126206 A1* | 9/2002 | Hunte ........................... 348/148 |
| 2008/0055741 A1* | 3/2008 | Asami ........................... 359/738 |
| 2008/0147280 A1* | 6/2008 | Breed ............................. 701/46 |
| 2009/0001764 A1* | 1/2009 | Hoppenstein et al. ... 296/203.01 |
| 2009/0273941 A1* | 11/2009 | Englander et al. ............. 362/464 |
| 2010/0288896 A1* | 11/2010 | Church .................... 248/226.11 |

* cited by examiner

*Primary Examiner* — Ranodhi Serrao
*Assistant Examiner* — Farrukh Hussain
(74) *Attorney, Agent, or Firm* — Schiff Hardin LLP

(57) ABSTRACT

A vehicle camera mount has a bracket, a support arm, and a camera housing. The bracket is used to fasten the support arm to a vehicle. The camera housing is connected to the support arm, the camera housing contains a camera, and the camera housing has a wind resistance reducing aerodynamic profile configured to reduce wind resistance by the camera housing as the vehicle is moving. The support arm is configured to support the camera housing to the vehicle so that the camera housing is above a front fender of the vehicle and alongside a hood of the vehicle.

12 Claims, 8 Drawing Sheets

US 8,896,698 B2

1

FRONT END MOUNTED VIDEO CAMERA FOR VEHICLE

TECHNICAL FIELD

The description herein relates to the mounting of a video camera to the front end, such as to the hood or fender, of a vehicle, such as a heavy duty truck.

BACKGROUND

The use of a video camera to enhance a driver's vision from an automobile or any vehicle in general is well known. Also, it has been known for many years to mount mirrors on truck fenders or hoods as a supplemental viewing aid in order to improve safety while changing lanes, merging into fast moving traffic, and otherwise maneuvering.

Mirrors mounted to fenders or hoods are large, thereby creating significant wind resistance. This wind resistance reduces fuel efficiency and increases noise. Wind resistance can be reduced by replacing such mirrors with an aerodynamic housing containing a camera. Thus, fuel economy is improved and noise is reduced.

Previous attempts to replace fender mounted mirrors with video cameras involved mounting the camera directly onto the fender or other part of the vehicle body with a low profile housing. However, low profile housings, although reducing wind resistance, can promote obscuring of the lens by dirt and spray. Positioning of the camera can also promote obscuring of the lens by dirt and spray. For example, if the camera has a low mounting position and location within the aerodynamic footprint of the vehicle, the camera will be highly vulnerable to rain, snow, and slush spray generated by passing vehicles.

Moreover, if the camera is positioned too far away from the mirrors, the camera image is too different as compared to the mirror image, making it difficult for the driver to make quick and accurate judgment decisions. Also, if the camera is positioned too low on the vehicle, the ability of the driver to determine from the image which lane any overtaking vehicles are in is impeded. An improper viewing angle of the lens combined with an improper position makes identification of potential dangers from other road users more difficult.

It is further known to mounting cameras within or on a mirror housing. Such cameras are used to provide additional supplemental views to the standard mirror reflection image. These mirrors are generally located on the vehicle in the optimum position for use of the mirror. The camera's view is the same as that the view through the side window or in some cases through the front window. The field of view from such cameras is generally different from the view of front mounted convex mirrors used for lane changing. Also, mirrors with cameras do not sufficiently reduce aerodynamic resistance.

The camera mount described below overcomes one or more of these or other problems.

DETAILED DESCRIPTION

Figure 1:
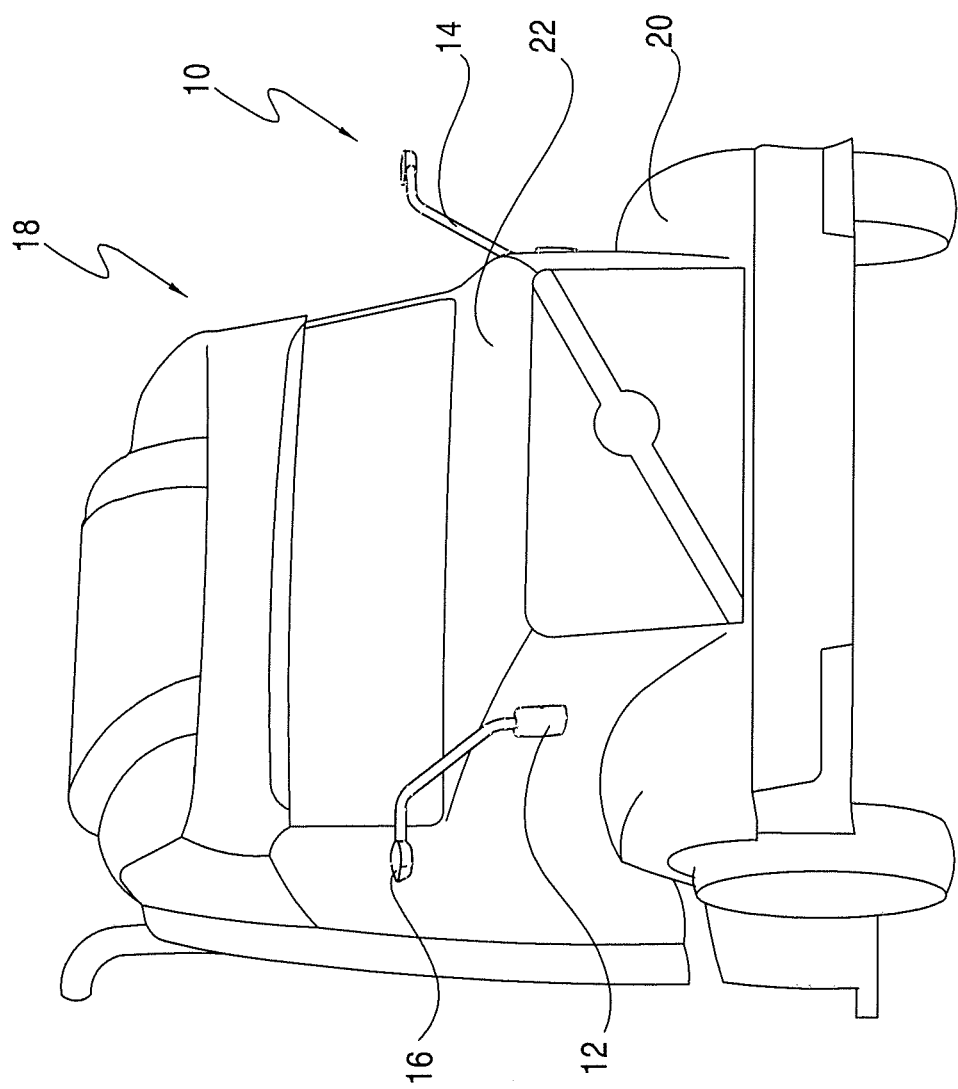
FIG. 1 shows a camera mount that mounts a camera on a vehicle.
Figure 2:
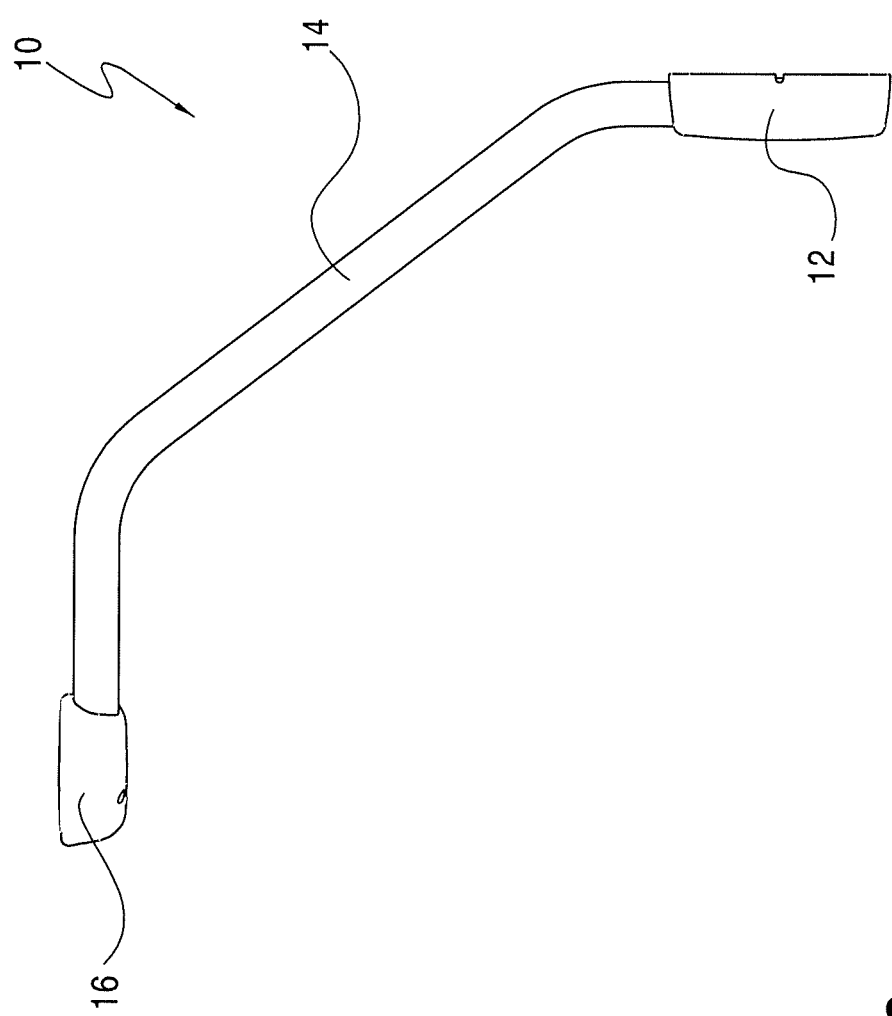
FIGS. 2 and 3 are different view of the camera mount of FIG. 1.
Figure 3:
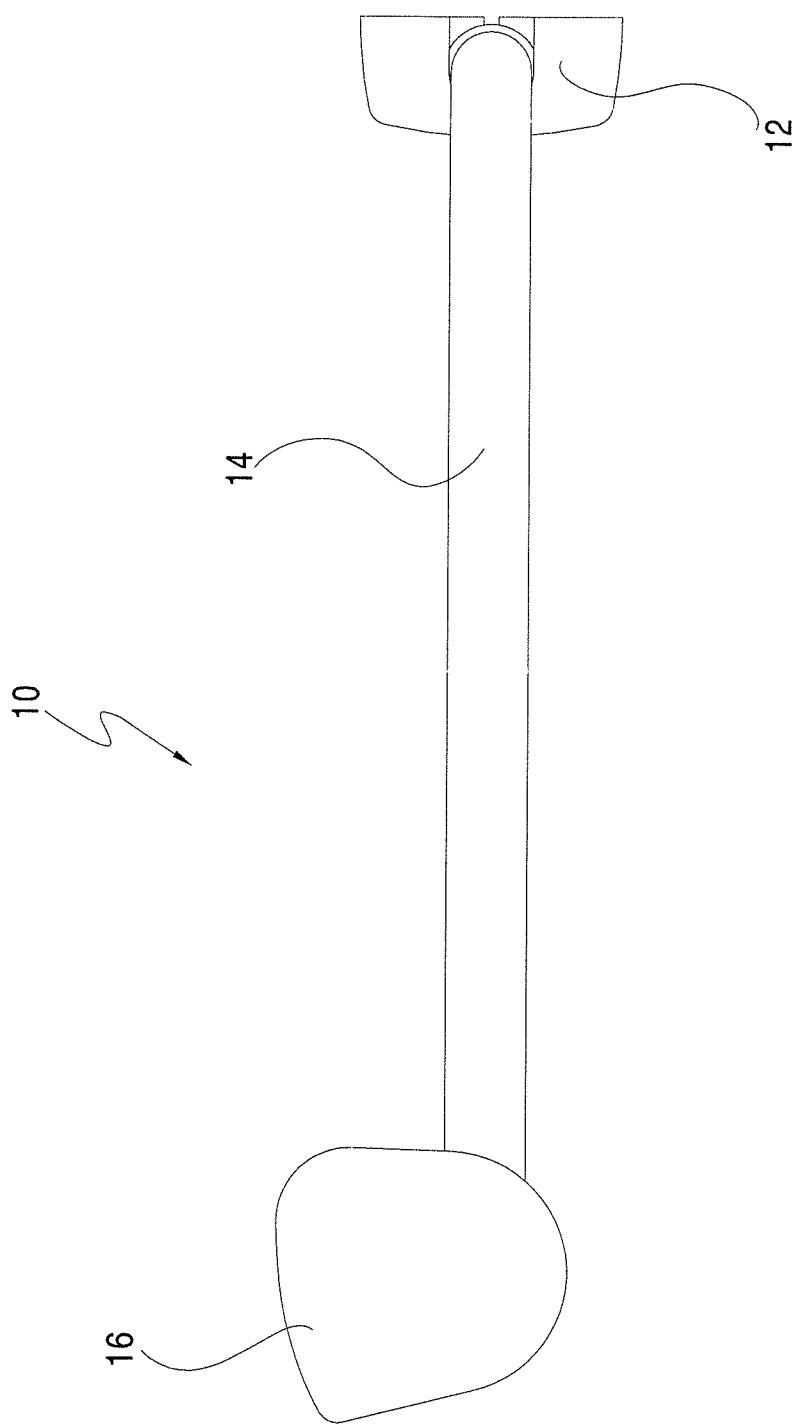

As shown in FIGS. 1-7, a camera mount 10 includes a bracket 12, a support arm 14, and a camera housing 16. The bracket 12 is configured to mount the camera mount 10 to a vehicle 18. For example, the bracket 12 is configured to mount the camera mount 10 to a fender 20 or to a hood 22 of the vehicle 18. The bracket 12, for example, may include holes (not shown) to receive bolts, screws, or other fasteners extending through the fender 20 or the hood 22 to attach the bracket 12 to the vehicle 18. Other fastening arrangements may be used to fasten the bracket 12 to the fender 20 or to the hood 22.

Figure 7:
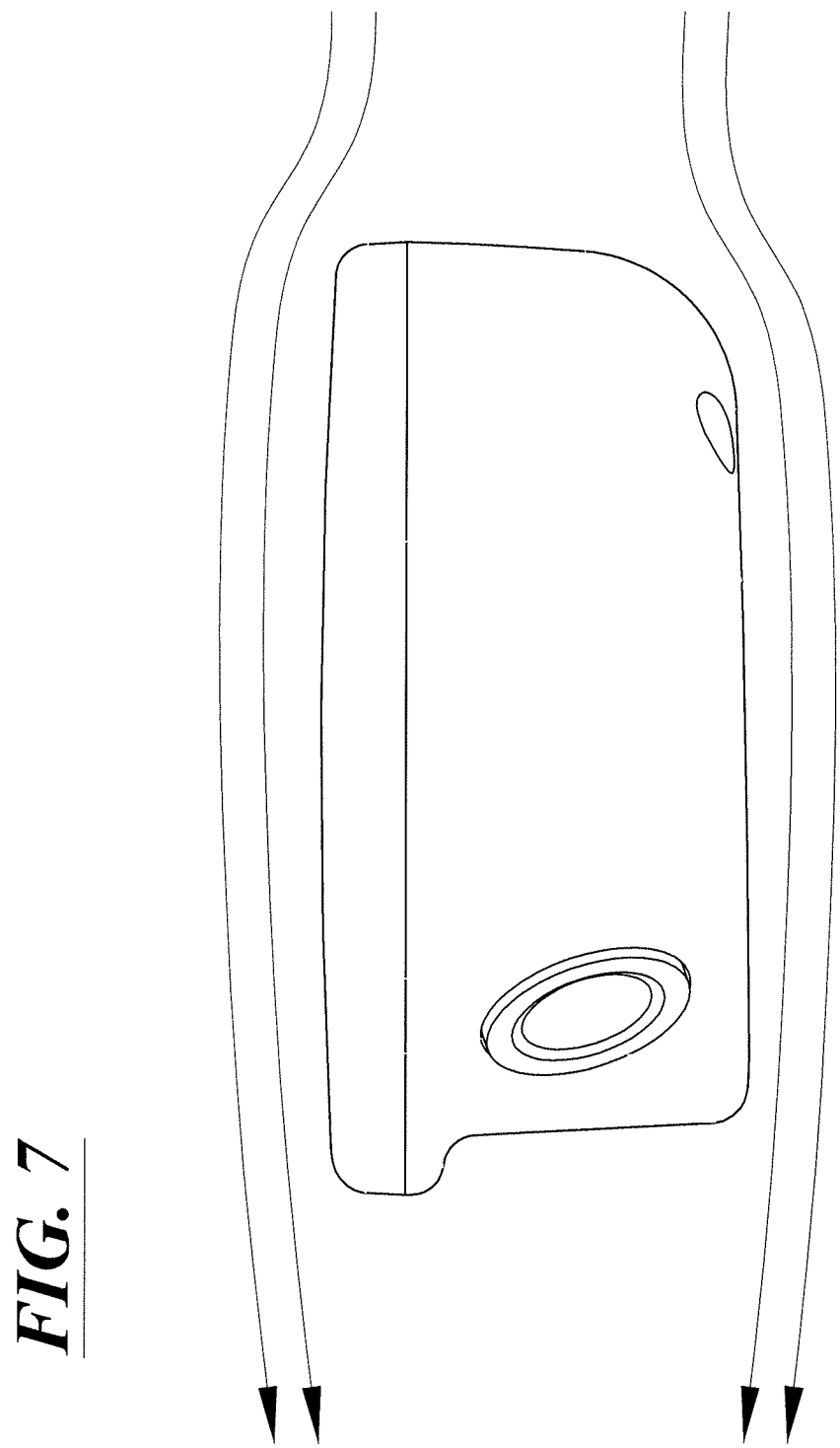
FIG. 7 illustrates the wind stream over the camera housing as the vehicle moves; and, FIG. 8 shows the profile of the camera housing as seen by someone standing in front of the vehicle.
Figure 8:
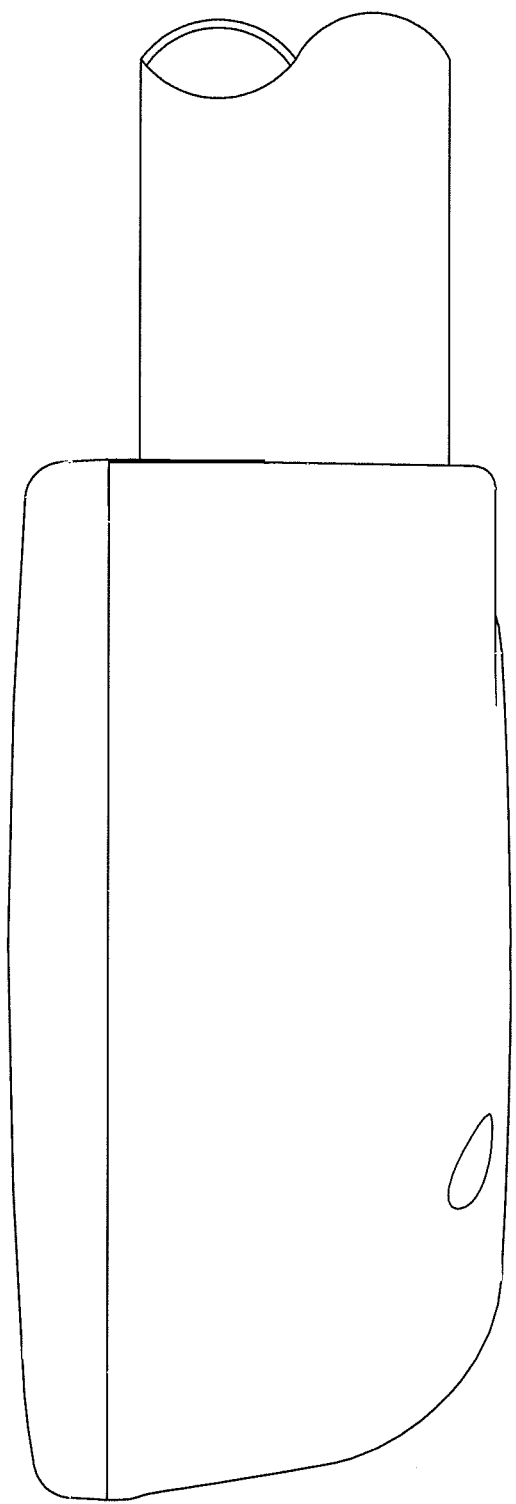

The camera housing 16 has a profile to achieve low wind resistance when the camera housing 16 is mounted to the fender 20 or to the hood 22 of the vehicle 18. This profile presents the wind with a small surface area and an aerodynamic shape configured to allow wind to pass easily, with little resistance, around the camera housing 16. FIG. 7 shows the wind stream over the camera housing as the vehicle moves FIG. 8 shows the profile of the camera housing 16 as seen by the wind caused by movement of the vehicle 18. Most of the surface area of the camera housing 16 is parallel to the wind when the vehicle 18 is moving. The surface area of the camera housing 16 that faces the wind when the vehicle 18 is moving is, for example, 13% of the total surface area of the camera housing 16. The surface area of the camera housing 16 that faces the wind when the vehicle 18 is moving is preferably in the range of 5% to 30% of the total surface area of the camera housing 16.

The preferred shape of the camera housing 16, for example, is one that is rounded or tapered at the front to present a thin edge to the airflow, and that has flat surfaces on the top and bottom to enable laminar airflow. The rear edge of the camera housing 16, for example, should be vertical or nearly vertical with sharper edges to release the airflow and avoid deflecting air towards the transparent window (42) through which the camera views.

The support arm 14 is suitably attached to both the bracket 12 and the camera housing 16. The support arm 14 may be attached to the bracket 12, for example, by a semi-circular clamp (similar to the clamp 24 discussed below).

Figure 4:
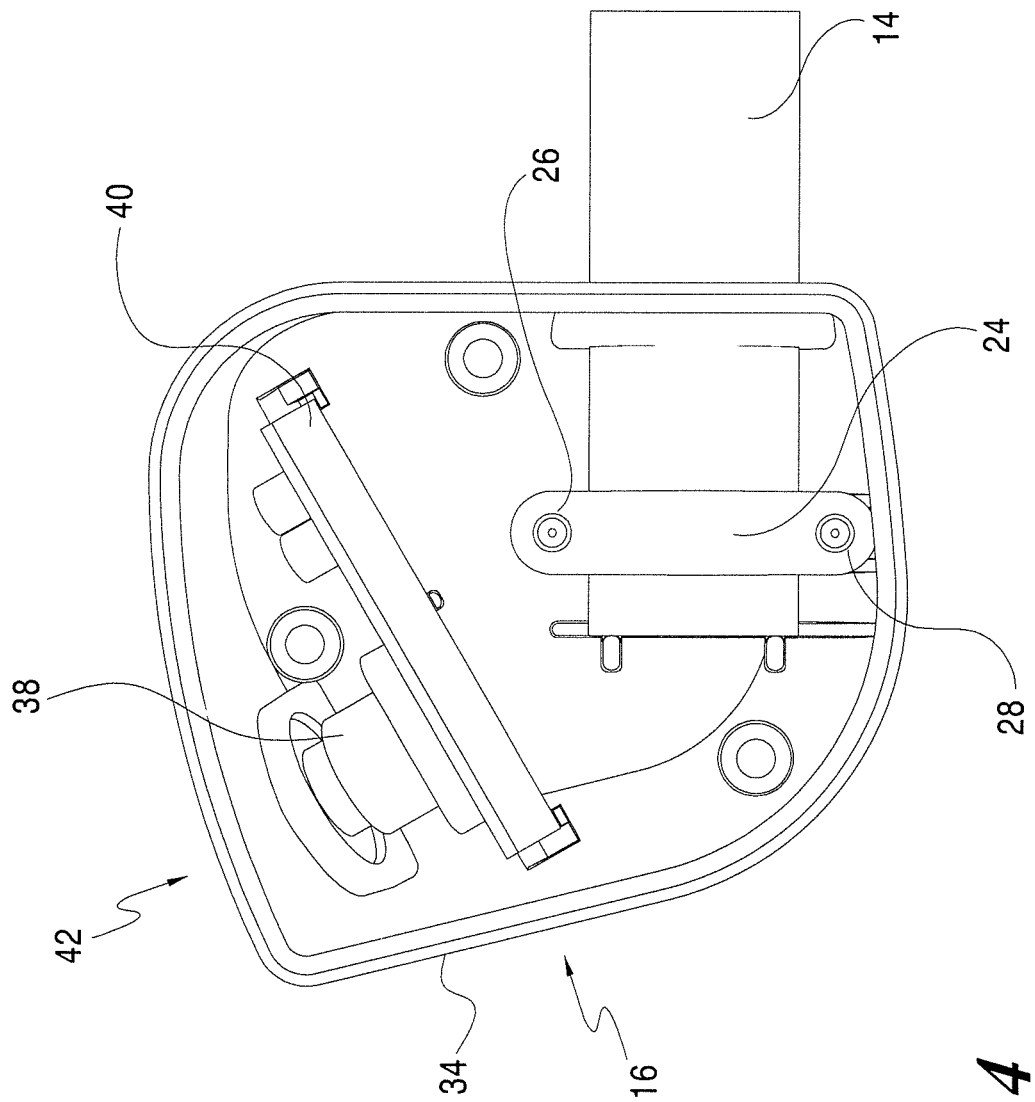
FIG. 4 illustrates a support arm and an interior of a camera housing that are part of the camera mount of FIG. 1 and also attachment of the support arm to the camera housing.

As shown in FIG. 4, a semi-circular clamp 24 is provided with ears 26 and 28 having corresponding holes extending therethrough. The holes through the ears 26 and 28 align with holes extending into posts 30 and 32 molded or otherwise formed with a housing part 34. The housing part 34 is part of the camera housing 16.

When the support arm 14 is to be attached to the camera housing 16, the support arm 14 is inserted through a hole 36 extending through a side wall of the housing part 34, the semi-circular clamp 24 is placed over the support arm 14 as shown in FIG. 4 so that the holes through the ears 26 and 28 align with the holes in the posts 30 and 32. Fasteners such as screws are applied to the holes through the ears 26 and 28 and the holes in the posts 30 and 32 so that the semi-circular clamp 24 exerts sufficient force on the support arm 14 so as to clamp and secure the housing part 34 to the support arm 14.

Figure 5:
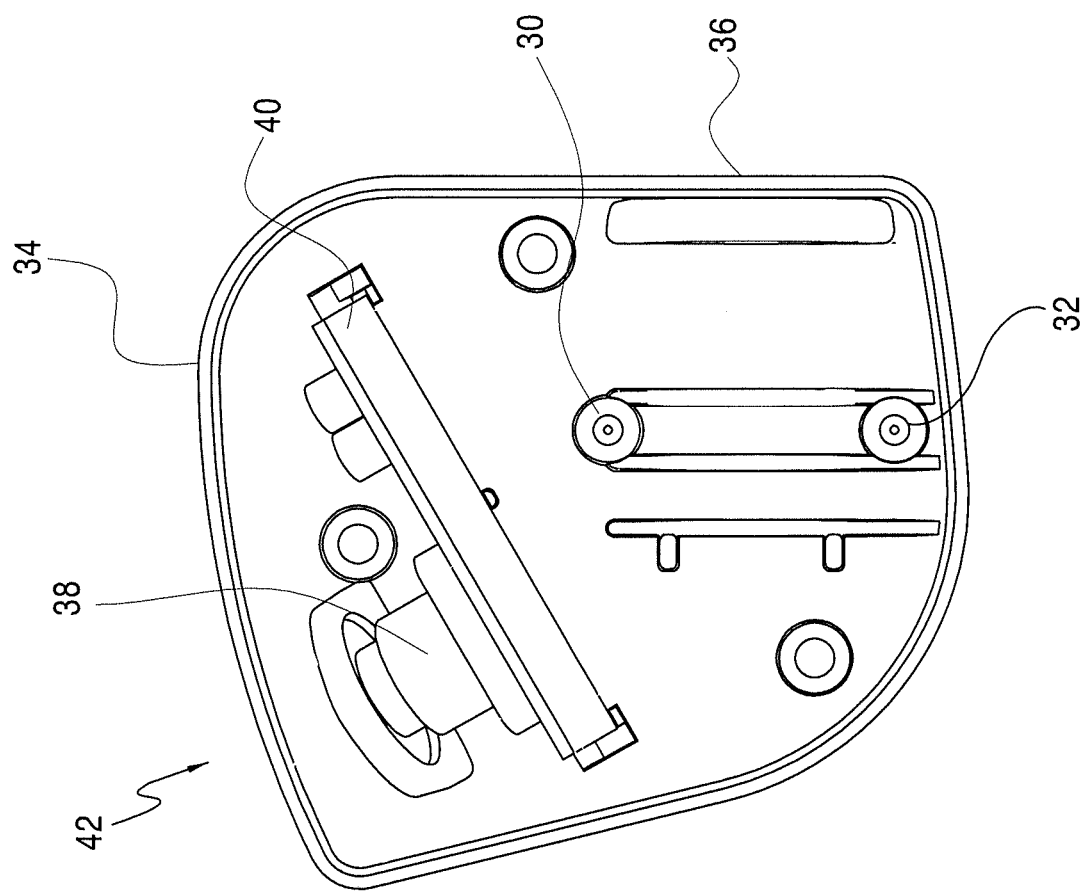
FIG. 5 illustrates the interior of a camera housing as in FIG. 4 but without the support arm attachment.
Figure 6:
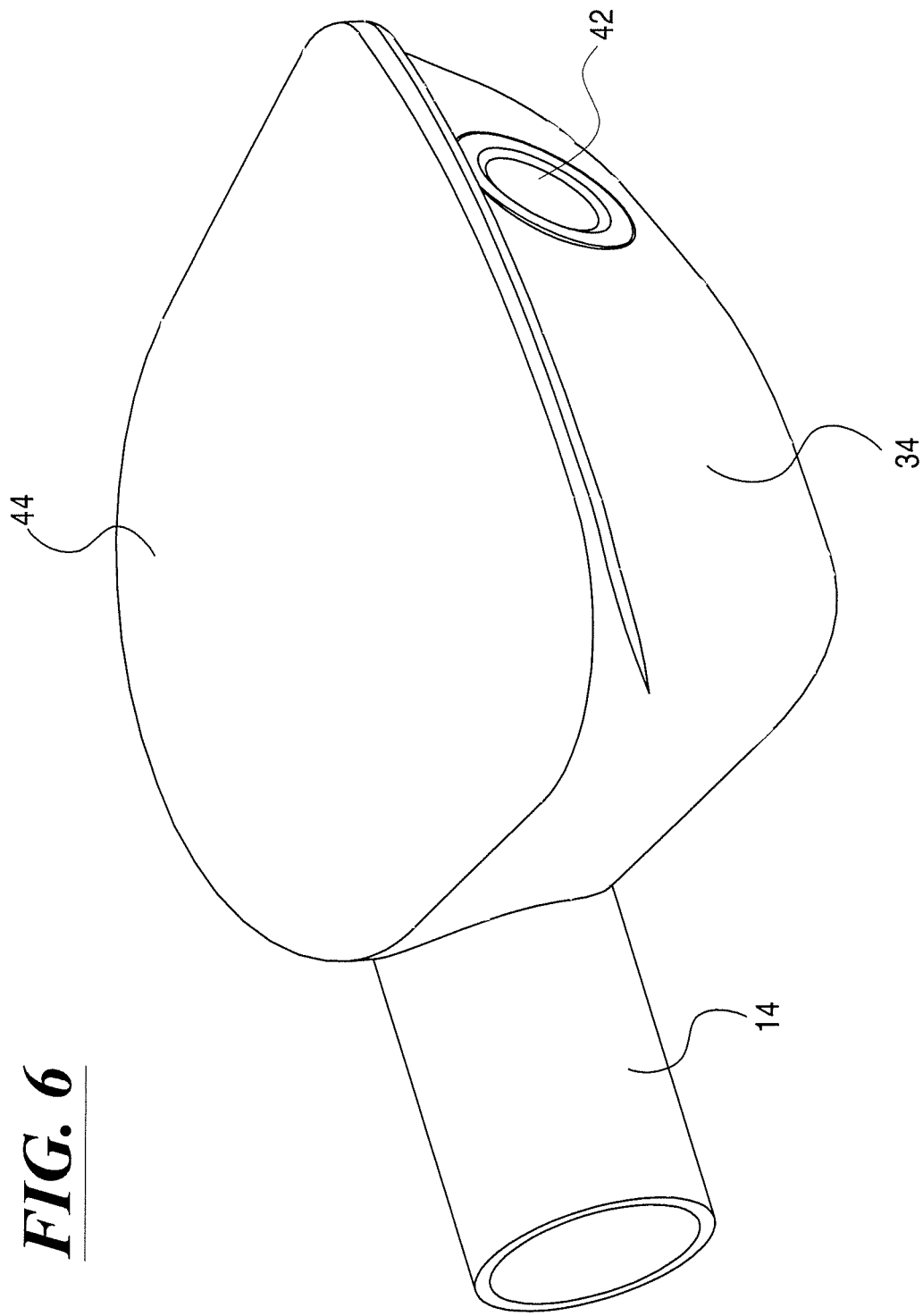
FIG. 6 illustrates the camera housing of the previous figures with a housing cover.

Also as shown in FIGS. 4 and 5, a camera 38 is provided within the housing part 34. The camera 38 is supported by a printed circuit board 40 that is suitably fastened to the housing part 34 such as by tabs that are integrally form with the housing part 34. The camera 38 is mounted within the housing part 34 by the printed circuit board 40 so that its lens is directed toward a transparent window 42 (FIG. 6) in a wall of the housing part 34. The transparent window 42 may be a hole though the side wall of the housing part 34, or the transparent window 42 may be a transparent plastic or glass material in the side wall of the housing part 34, or otherwise.

Accordingly, the field of view of the camera 38 is through the transparent window 42. The printed circuit board 40, for example, may be used to provide suitable circuitry to process signals from the camera 38 so that the image taken by the camera 38 can be presented on a display for viewing by the operator of the vehicle 18. This display is located for easy viewing by the operator. For example, this display may be located on an outside or inside mirror of the vehicle 18, or on an overhead console of the vehicle 18, or preferably on the top of the instrument consol either side of the steering wheel, or otherwise.

A cover 44 (FIG. 6) closes off the housing part 34. For example, the cover 44 may be applied by a friction fit to the housing part 34, or the cover 44 may be screwed or bolted to the housing part 34, or the cover 44 may be otherwise fastened to the housing part 34. If desired, a gasket can be provided between the cover 44 and the housing part 34 so as increase a water tight seal to protect the interior of the camera housing 16 from weather and debris.

The camera mount 10 is mounted to the fender 20 or to the hood 22 of the vehicle 18 so as to present the wind caused by movement of the vehicle 18 a small and aerodynamically enhanced profile that reduces or minimizes wind resistance. Also, the camera mount 10 is mounted to the fender 20 or to the hood 22 of the vehicle 18 so as to provide a camera view that is a similar to or improves the provided by the outside mirror that is conventionally used on the vehicle 18, while at the same time reducing aerodynamic drag and improving the general appearance of the vehicle 18. Improved fuel economy and reduced noise are thereby achieved.

Typically the surface area of the camera housing 16 presented to the airflow should be less than 10% of the area of an equivalent mirror conventionally used for the same purpose, that is to give a wide view of other vehicles either side of the truck.

The camera mount 10 mounts the camera 38 in the aerodynamic shaped camera housing 16 and can position the camera 38 above the fender 20 and outside of the body of the vehicle 18 in a clear airflow. The camera may be higher than the hood but should be positioned such that it is clear of the vehicle's body to enable clean airflow above and below the camera housing. The camera would typically be mounted close to the position occupied by mirrors used for the same viewing purpose.

Thus, the transparent window 42 and/or the lens of the camera 38 remains clean, enhancing the driver's view of the road and other vehicles while at the same time reducing the vulnerability of camera 38 to dirt, rain, snow, and the slush spray that is generated by passing vehicles. The transparent window 42 additionally may be coated with a hydrophilic or hydrophobic coating to reduce the obscuring of the lens by dirt and/or spray.

An additional advantage of the camera mount 10 is that, by positioning the camera 38 closer to the position of the conventional outside, rear facing mirrors, the image seen by the camera 38 is closer to the image the driver sees in the mirror, which allows the driver to make faster and more accurate judgment decisions.

The higher camera position provided by the camera mount 10 improves the ability of the driver to determine from the camera image the lanes of any overtaking vehicles. The viewing angle of the lens of the camera 38 combined with the position of the camera 38 contributes to the ease of identifying potential dangers from other road users.

By mounting the camera 38 in a housing that is attached to a support enables easy angular adjustment of the camera 38 in the vertical and horizontal direction. This range and ease of angular adjustment has typically not been possible with cameras mounted in housings directly mounted on the vehicle body or fender. The vertical angular adjustment is performed by rotating the camera housing 16 around the support tube 14, The clamp 24 allows this limited movement. Similarly, the tube 14 has limited rotation within the mounting bracket 12 enabling horizontal adjustment of the camera housing 16.

FIG. 7 illustrates the wind side of the profile of the camera housing 16. In this case, the camera mount 10 is mounted to the fender of the vehicle.

Modifications of the present invention will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A vehicle camera mount comprising:
a bracket configured to be fastened to a vehicle;
a support arm connected to the bracket; and
a camera housing connected to the support arm, the camera housing being configured to house a camera therein,
wherein the camera housing has an aerodynamic profile configured to produce laminar air flow around the camera housing to minimize the wind resistance thereof when the vehicle is moving,
wherein, when the vehicle is in motion, the support arm is configured to position the camera housing in a portion of a wind air flow stream outside a boundary layer of air flow caused by outer surfaces of the moving vehicle displacing air immediately ahead of the vehicle, which portion's air flow path is otherwise unaffected by the moving vehicle or outer surfaces thereof, and
wherein the support arm supports the camera housing
wherein the camera housing has a total surface area, wherein the camera housing has a wind facing surface area that faces the wind when the vehicle is moving, and wherein the wind facing surface area is in the range of 5% to 30% of the total surface area.

2. The vehicle camera mount of claim 1 wherein the camera housing has a total surface area, wherein the camera housing has a wind facing surface area that faces the wind when the vehicle is moving, and wherein the wind facing surface area is 13% of the total surface area.

3. The vehicle camera mount of claim 1 wherein the support arm is fastened to the camera housing so as to permit rotation of the camera housing around a vertical axis.

4. The vehicle camera mount of claim 1 wherein the support arm is fastened to the camera housing so as to permit rotation of the camera housing around a horizontal axis.

5. The vehicle camera mount of claim 1 wherein the support arm is fastened to the camera housing so as to permit rotation of the camera housing around vertical and horizontal axes.

6. The vehicle camera mount of claim 1 wherein the camera is supported by the camera housing so that, when the support arm is fastened to the camera housing and the bracket is fastened to the vehicle, the camera has a field of view in a direction reverse to the forward motion of the vehicle.

7. A vehicle camera mount comprising:
- a bracket configured to be fastened to a vehicle;
- a support arm connected to the bracket;
- a camera housing connected to the support arm and housing a camera in an interior space thereof,
- wherein the camera housing has an aerodynamic profile configured to produce laminar air flow around the camera housing to minimize the wind resistance thereof as the vehicle is moving,
- wherein, when the vehicle is in motion, the support arm is configured to position the camera housing in a portion of a wind air flow stream outside a boundary layer of air flow caused by outer surfaces of the moving vehicle displacing air immediately ahead of the vehicle, which portion's air flow path is otherwise unaffected by the moving vehicle or outer surfaces thereof,
- wherein the support arm is configured to support the camera housing so that the camera housing is positioned above a front fender of the vehicle and alongside a hood of the vehicle; and
- wherein the camera housing has a total surface area, wherein the camera housing has a wind facing surface area that faces the wind when the vehicle is moving, and wherein the wind facing surface area is in the range of 5% to 30% of the total surface area.

8. The vehicle camera mount of claim 7 wherein the camera housing has a total surface area, wherein the camera housing has a wind facing surface area that faces the wind when the vehicle is moving, and wherein the wind facing surface area is 13% of the total surface area.

9. The vehicle camera mount of claim 7 wherein the support arm is fastened to the camera housing so as to permit rotation of the camera housing around a vertical axis.

10. The vehicle camera mount of claim 7 wherein the support arm is fastened to the camera housing so as to permit rotation of the camera housing around a horizontal axis.

11. The vehicle camera mount of claim 7 wherein the support arm is fastened to the camera housing so as to permit rotation of the camera housing around vertical and horizontal axes.

12. The vehicle camera mount of claim 7 wherein the camera is supported by the camera housing so that, when the support arm is fastened to the camera housing and the bracket is fastened to the vehicle, the camera has a field of view in a direction reverse to the forward motion of the vehicle.

* * * * *